Feb. 24, 1953

H. F. HOPKINS 2,629,783

TELEPHONE CIRCUIT

Filed Dec. 27, 1950

INVENTOR
H. F. HOPKINS

BY H. A. Burgess

ATTORNEY

Patented Feb. 24, 1953 2,629,783

UNITED STATES PATENT OFFICE 2,629,783

TELEPHONE CIRCUIT

Harris F. Hopkins, Chatham, N. J., assignor to Bell Telephone Laboratories, Incorporated, New York, N. Y., a corporation of New York Application December 27, 1950, Serial No. 202,887

19 Claims. (Cl. 179—81)

Figure 1:
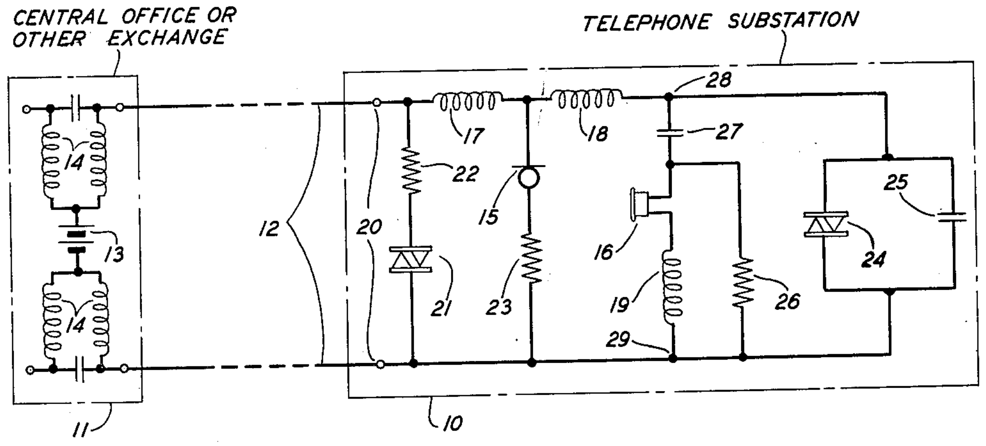

This invention relates to transmission level equalizing circuits which may be embodied in telephone substation circuits and to networks for reducing sidetone in such substation circuits. A telephone substation circuit is herein defined as the circuit normally located at a subscriber's premises which includes a telephone transmitter, receiver and associated networks, such as a sidetone balancing network, if the circuit is of the anti-sidetone type.

It is an object of this invention to equalize the transmission levels at the line terminals of telephone substation circuits.

A further object of the invention is to minimize the sidetone present in a substation circuit regardless of the length of the loop to which the circuit is connected.

Another object of the invention is both to equalize the transmission level at a substation circuit and to maintain a relatively constant sidetone balance irrespective of the impedance of the loop in which the substation circuit is connected.

Inherent in all of the objects of the invention is a desire to decrease the cost and the bulk of the component parts of a high efficiency anti-sidetone substation circuit which includes a loop impedance equalizer. Although on a system basis it is possible to reduce initial cost of telephone sets by including certain refinements only on loops where they are most needed there are many engineering, manufacturing and installation advantages in having a universal set. With a universal set, the cost per unit becomes more important, and when it is realized that in a large telephone system, as many as several million telephone sets are made and installed in a year, the importance of even small savings per set is better appreciated.

Although sidetone in its broadest sense in the telephone art includes all components of energy which produce sound in a talker's ear due to his own talking, the sidetone referred to herein is that component of the talker's speech which is electrically coupled by way of the substation circuit from the transmitter to the local receiver when the subscriber is talking.

Substation circuits are generally interconnected by transmission paths which lead to either a central office or other exchange such as a private branch exchange. With a common battery type system, direct current is supplied by the central office or exchange to the substation over the connecting telephone lines. As a general rule, substation subscribers are located over a wide range of distances from their central office or exchange. With a universal substation set, there will be a corresponding wide range in the level of the signals transmitted and received by the subscribers unless means are employed to compensate for the variations in loop length. Further, if the substation circuit is of the anti-sidetone type, the sidetone balancing network will provide optimum balance for only one value of loop impedance unless compensating means are provided.

There are described in several copending applications volume equalizers comprising non-linear resistance elements. In the first of these, application Serial No. 793,170, filed December 22, 1947, by Botsford, Boysen, Aikens, Dietze, Goodale and Inglis, a resistance element having a positive temperature coefficient is included in series with the transmitter to equalize the volume level of transmitted voice signals. To equalize the volume levels of received signals, a resistance element having a negative coefficient is thermally coupled to the positive resistance element and is connected in shunt with the receiver. In the second, an application by E. I. Green, Serial No. 155,329, filed April 11, 1950, two indirectly heated resistance elements having negative temperature coefficients are connected, one in parallel with the transmitter and the other in parallel with the receiver. The heater coils for the variable resistance elements are connected in series with the transmitter and a third negative coefficient resistant element is connected in parallel with the heating coils to compensate for ambient temperature changes. In the third copending application, Serial No. 194,870, filed November 9, 1950, by W. D. Goodale, Jr., directly heated resistance elements having negative temperature coefficients are connected, one in parallel with the transmitter and one in parallel with the receiver. In each of these copending applications a presumably unvariable sidetone balancing network is disclosed. The negative resistance elements disclosed in these three applications are more generally known as thermistors and are described, for example, in an article entitled "Thermistors, their characteristics and uses," by G. L. Pearson, Bell Laboratories Record, vol. 19, December 1940, pages 106 through 111.

Applicant has discovered that equalization for substation circuits may be obtained by connecting a current-sensitive resistance element across the line terminals of the substation circuit. As the loop length and hence loop impedance varies, the direct current flowing through the loop will vary and if the current-sensitive element has the proper degree of non-linearity, the received and the transmitted levels at the substation terminals will be held substantially constant, assuming constant inputs at the transmitters. Equalization is thus effected by a single element instead of two.

A variable shunt across the substation circuit will impose an additional burden on the sidetone balancing circuit since, with the variable shunt, the loop impedance "looking out" from the line terminals will vary over a greater range than without the variable shunt. However, applicant has further discovered that this additional burden may be alleviated by employing in combination with the variable shunt equalizing circuit, a variable line balancing circuit, for example, one which also includes a current-sensitive resistance element. If the latter current-sensitive element is also responsive to the loop direct current and if it also has the proper degree of non-linearity, the sidetone level will be held low regardless of the loop length. With the combination just described, it becomes unnecessary to include inductance in the line balancing network which may otherwise be deemed necessary to reflect the inductive effect of relatively short loops since the shunt equalizer will have a low impedance on short loops and make the shorter loops appear predominately resistive instead of inductive. The elimination of this inductance permits an appreciable saving, both in cost and in bulk.

The non-linear or current-sensitive resistance elements employed in the illustrative circuits described below are more commonly known as varistors. Varistors having positive resistance characteristics over their non-linear range are described for example in several articles appearing in The Bell Laboratories Record, "Varistors: Their characteristics and uses," by J. A. Becker, July 1940; "The copper oxide varistor," by W. H. Brattain, January 1941; and "Silicon carbide varistors," by R. O. Grisdale, October 1940.

Figure 2:
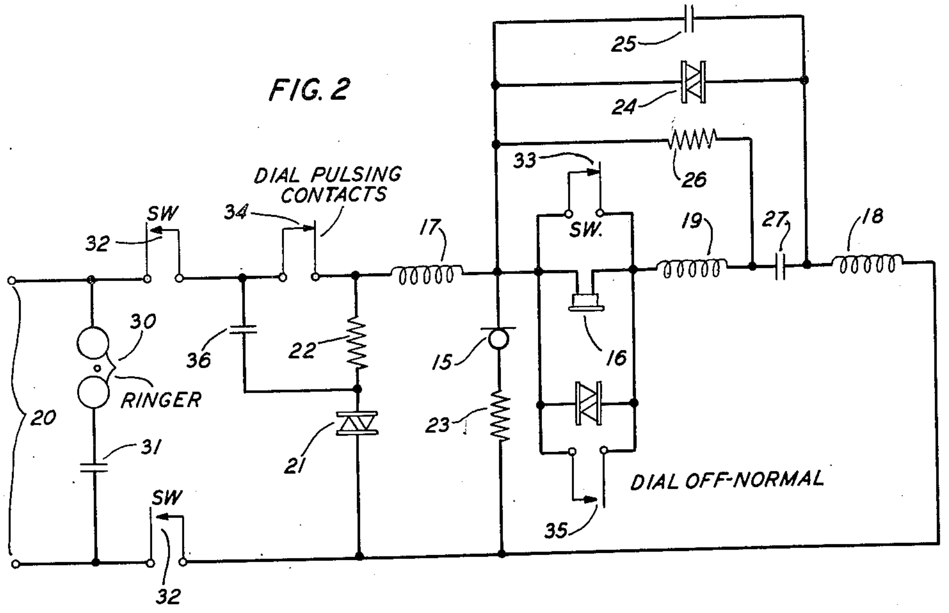

Other objects and features of the invention may be understood from a consideration of the following detailed description when read in accordance with the attached drawings in which:

Fig. 1 is a simplified schematic drawing of a telephone substation circuit embodying principles of the invention; and Fig. 2 is a more complete showing of a circuit similar to the simplified circuit of Fig. 1.

Referring now to Fig. 1, a substation circuit 10 of the common battery anti-sidetone type is connected to a central office or other exchange 11 by a telephone line 12. For present illustrative purposes it is believed sufficient to show at the central office or exchange only the common direct-current supply comprising the battery 13 and the battery supply coils 14. The substation circuit comprises a transmitter 15 and receiver 16 which are connected in an anti-sidetone circuit by means of the three windings 17, 18 and 19 of the multiple winding inducting coil. Windings 17, 18 and 19 are mutually coupled and are adapted to obtain a conjugate relation between the transmitter and receiver. The conjugacy is promoted by a proper selection of the turns ratios and by proper poling of the three windings.

The various substations connected to a given central office are usually located at different distances from the central office so that the resistance, inductance and capacitance in the subscriber's loop, where the "loop" is defined as the path comprising the substation 10, transmission line 11 and the central office 12, may and usually does vary from subscriber to subscriber. Were no compensating means employed, the transmission levels, i. e. received and transmitted levels, at the line terminals 20 of the substation circuit would tend to be high on short loops and low on long loops. Since the substation circuit is designed as a high efficiency device in order to clearly receive signals even on the longer loops, the volume level at the receiver on a short loop may be undesirably high.

In accordance with a first principle of the invention a current-sensitive resistance element 21, which may for example comprise a symmetrical varistor is connected in series with a resistor 22 across the telephone line 12 at the line terminals 20 of the substation circuit. The non-linear resistance element 21 preferably has a resistance characteristic such that the transmission level at the line terminals of the substation circuit will be fairly constant regardless of the impedance of the subscriber's loop. As is well known, the efficiency of the transmitter 15, that is, circuit efficiency in contradistinction to electro-acoustical efficiency, will vary with the amount of direct current flowing through it. Since the non-linear element 21 will shunt variable amounts of direct current from the transmitter 15, a resistor 23 is connected in series with the transmitter to keep the variations in transmitter efficiency, on a percentage basis, low. In addition to reducing the transmitted power on short loops, the low alternating-current impedance resulting across the line terminals 20 of the substation telephone circuit on short loop conditions will also reduce the received power level at the set, if the current-sensitive element 21 has the desired coefficient.

The shunt equalizing element 21 may be any non-linear resistance element having a suitable characteristic to equalize the transmission level at the line terminals. An additional feature will result from the use of a non-linear element such as a silicon carbide varistor whose current voltage characteristic follows a power law since the alternating-current impedance of such an element will be a fraction, and more specifically one over the power, of the direct-current resistance. For example, a typical silicon carbide varistor in its non-ohmic range has a characteristic such that the current varies as the fourth power of the applied voltage. In this range, the alternating-current impedance is one-fourth the direct-current resistance, resulting in the feature that relatively small amounts of direct current need be drained from the line to obtain the desired alternating-current impedance. Copper oxide varistors can be fabricated with much higher degrees of non-linearity but will require double units poled in opposite directions due to their rectifying properties. Methods by which silicon carbide varistors having suitable characteristics for use as the elements 21 and/or 24 may be fabricated are described for example in a copending application of H. F. Dienel and G. K. Teal, Serial No. 160,542, filed May 6, 1950.

The variations in impedance across the line terminals place an additional burden on the line balancing network. In other words the sidetone balance will be poorer with the equalizer than without it. Further, the requirements of sidetone balance are greater in the present circuit than, for example, in those of the above-identified applications which disclose nonlinear resistance elements in shunt with both the transmitter and receiver, since in those circuits the receiver and transmitter efficiency and hence sidetone level are decreased by the low impedance shunts on the shorter loops.

In accordance with another principle of the invention, there is provided in combination with the shunt equalizing circuit, a variable line balancing network comprising the current-sensitive resistance element 24 and condenser 25. The element 24 may comprise, for example, a symmetrical varistor similar to element 21. It may also comprise any other suitable current-sensitive device. As previously mentioned if copper oxide varistors are used, double units are necessary due to their rectifying properties. Also to accommodate the impedance range over which the sidetone balancing element must work it has been found necessary to stack several copper oxide units in series which further adds to the bulk and cost of the element. Silicon carbide, on the other hand, has symmetrical conducting properties and can be fabricated in a single disc which will not only operate over the desired impedance range but will also have the proper degree of non-linearity. It may be that element 24, for example, in order to provide for the impedance ranges involved, has too high a degree on non-linearity, that is, the resistance may decrease too rapidly with increasing voltages. However, a resistor 26 may be connected in parallel with the receiver 16 and winding 19 to effectively modify the degree of non-linearity. Condenser 27 which is provided to keep direct current out of the receiver, is also connected so as to isolate resistor 26 from direct currents so as to avoid undue direct-current power loss.

It may be seen from the figure that for zero sidetone, in the sense herein used, it is necessary that the current through the receiver 16, in response to energy flowing from the transmitter 15, be zero. As an approximation, this means that the voltage induced in winding 19 be equal and opposite to the voltage from point 28 to point 29 for energy emanating from the transmitter 15. The line balancing network is provided to maintain the balance irrespective of loop impedance, and in effect reflects some function of the loop impedance. As the loop resistance increases and the loop current decreases, the resistance of element 24 increases and if it has the proper degree of non-linearity, a proper resistance balance will be maintained. As is known, short loops have a reactive component which is primarily inductive. This inductive component is not particularly objectionable with low efficiency prior art substation circuit since the requirements for sidetone balance with such circuits are not so high. But with higher efficiency sets, the requirements for sidetone balance are correspondingly higher and in the prior art it has often been found desirable to include an inductance in the balancing network to compensate for this component in order to maintain good balance even on short loops. With the present circuit, however, an inductance in the balancing network is not necessary since on the shorter loops, element 21 will be a low resistance shunt across the line and substantially eliminate the inductive effect. A bulky and relatively costly inductance is therefore rendered unnecessary. On the longer loops, the reactive component is capacitive and since element 21 will then be a high impedance, a condenser 25 is included in the balancing network to reflect this capacitance and maintain balance on the longer loops.

A more detailed circuit embodying principles of the invention is shown in Fig. 2. In addition to the circuit elements described in connection with Fig. 1 and similarly numbered in Fig. 2, there is connected across the line near the input terminals a ringer 30 in series with a condenser 31. Switchhook contacts 32 are provided in both of the lines and a switchhook contact 33 is provided across the receiver 16. In a manner well known, switchhook contacts 32 are normally open while contact 33 is normally closed, short-circuiting the receiver. When the receiver is lifted from the cradle, for example, contacts 32 will first be closed and then contact 33 will open. Replacing the receiver in the cradle will first short-circuit the receiver 16 by closing contact 33 and will then open the line contacts 32. Contact 34 represents the normally closed dial pulsing contacts which are opened and closed by operating the dial to send signaling impulses to the central office. The receiver is short-circuited by the dial off normal contact 35 which is closed whenever the dial is turned off its normal idle position. The mechanical means which operate contacts 32, 33, 34 and 35 are well known in the art and their detailed showing in the drawings, for the purposes of the present illustration is not deemed necessary. Condenser 36 and resistor 22 form a filter across the dial pulsing contacts. The remainder of the circuit, although drawn in a slightly different manner, is, in an electrical sense, essentially the same as the circuit shown in Fig. 1.

Although the invention has been described with reference to specific embodiments, numerous other embodiments and modifications are within the scope of the invention and will readily occur to one skilled in the art. For example, the current-sensitive elements are not necessarily varistors but may also comprise, for example, thermistors, or other elements whose resistance is a function of the applied current.

What is claimed is:

1. A telephone circuit including a transmitting circuit, a receiving circuit and a telephone line connecting said transmitting and receiving circuit to a telephone exchange, a first current-sensitive resistance element connected in shunt with said line at a point near said transmitting and receiving circuits, and a line balancing network including a second current-sensitive resistance element connected in a shunt relation with said receiving circuit.

2. The combination with an anti-sidetone telephone circuit including a transmitting circuit, a receiving circuit and a line balancing network, a telephone exchange including a source of direct current, and a telephone line connecting said telephone circuit to said telephone exchange, of a first symmetrical varistor connected across the line terminals of said telephone circuit and a second symmetrical varistor connected in said line balancing network.

3. The combination in accordance with claim 2 and means to apply a portion of the direct current supplied by said source to each of said symmetrical varistors.

4. The combination in accordance with claim 2 wherein said symmetrical varistors comprise silicon carbide.

5. The combination in accordance with claim 2 wherein said receiving circuit comprises a receiver in series with a resistor.

6. The combination with a common battery type anti-sidetone telephone circuit having a line balancing network which is automatically variable with variations in direct current of a current-sensitive resistance element shunting the input to said circuit.

7. In a telephone system comprising a telephone exchange including a source of current, a plurality of substation circuits and a plurality of telephone lines of different resistances connecting said substation circuits to said exchange, the combination with each of said substation circuits of a first current dependent resistance element connected in shunt with the line terminals of said substation, a line balancing network for reducing sidetone including a second current dependent element, and means to cause a portion of the current flowing from said source to flow through each of said current dependent elements.

8. The combination in accordance with claim 7 and a resistor connected in parallel, for alternating currents, with said second current dependent element.

9. An anti-sidetone telephone circuit including a transmitter and a receiver, means comprising a plurality of mutually coupled inductances adapted to connect said transmitter and said receiver to the line in conjugate relation to each other, a first current-sensitive resistance element connected in a shunt relation with said line, and a line balancing network connected in a shunt relation with said receiver and one of said inductances, said network including a current-sensitive element.

10. The combination in accordance with claim 9 wherein said network also includes a capacitor.

11. The combination in accordance with claim 9 and a resistor connected in shunt with said receiver and said one of said inductances.

12. In a telephone system, a telephone exchange, a substation circuit, and a telephone line connecting said substation circuit to said exchange, said substation circuit comprising a transmitting circuit, a receiving circuit and a line balancing network, a first symmetrical varistor shunting the line terminals of said substation circuit, and said line balancing network including a second symmetrical varistor.

13. The combination in accordance with claim 12 wherein said first symmetrical varistor comprises silicon carbide.

14. The combination in accordance with claim 12 wherein said second symmetrical varistor comprises copper oxide.

15. In a telephone system, a telephone exchange, a substation circuit including a transmitting circuit, a receiving circuit and a line balancing network, a telephone line for connecting said substation circuit to said exchange, a varistor connected in shunt with said line at said substation, and said line balancing network including a thermistor.

16. A telephone circuit including a transmitter and a receiver, a first resistor in series with said transmitter, means comprising a plurality of mutually coupled inductances adapted to connect said transmitter and said receiver in a conjugate relation, a first current-sensitive resistance element shunting the line terminals of said telephone circuit, a line balancing network including a second current-sensitive resistance element and capacitance connected in a shunt relation with said receiver and one of said inductances, a second resistor connected in parallel, for alternating currents, with said receiver and said one of said inductances, and means to prevent direct current from flowing through said receiver, said one of said inductances, and said second resistor.

17. The combination in accordance with claim 16 wherein said current-sensitive resistance elements comprise silicon carbide.

18. In a telephone system comprising a telephone exchange including a source of direct current, a plurality of substation circuits each including a transmitter and a receiver, a plurality of telephone lines of different impedances connecting each of said substation circuits to said exchange, the combination with each of said substation circuits of a first device comprising silicon carbide connected in shunt with the line connecting the substation to the exchange, a line balancing network including capacitance and a second device comprising silicon carbide, means to cause a portion of the direct current supplied by said source to flow through each of said devices and a resistor connected in parallel, for alternating currents, with said second device.

19. The combination in accordance with claim 18 and resistance in series with said receiver at each of said substation circuits.

HARRIS F. HOPKINS.

REFERENCES CITED

The following references are of record in the file of this patent:

UNITED STATES PATENTS

| Number | Name | Date |
|---|---|---|
| 2,287,998 | Johnson | June 30, 1942 |
| 2,288,049 | Tillman | June 30, 1942 |
| 2,387,269 | Johnson | Oct. 23, 1945 |